United States Patent
Romanato (10) Patent No.: US 9,567,966 B2
(45) Date of Patent: Feb. 14, 2017

(54) METHOD OF CONTROLLING AN AUTOMATIC ENGINE STOP DURING COASTING PHASE

(71) Applicant: GM GLOBAL TECHNOLOGY OPERATIONS LLC, Detroit, MI (US)

(72) Inventor: Roberto Romanato, Settimo Torinese (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 199 days.

(21) Appl. No.: 14/514,159

(22) Filed: Oct. 14, 2014

(65) Prior Publication Data

US 2015/0106000 A1   Apr. 16, 2015

(30) Foreign Application Priority Data

Oct. 14, 2013  (GB) .................. 1318117.7

(51) Int. Cl.
   *F02D 17/00*   (2006.01)
   *F02N 11/08*   (2006.01)

(52) U.S. Cl.
   CPC ... *F02N 11/0837* (2013.01); *F02N 2200/0801* (2013.01); *F02N 2200/0805* (2013.01); *F02N 2200/0808* (2013.01); *F02N 2200/124* (2013.01); *Y02T 10/48* (2013.01)

(58) Field of Classification Search
   CPC .............. F02N 2200/0801; F02N 2200/0805; F02N 2200/0808; F02N 11/0837; F02N 2200/124; Y02T 10/48
   USPC ........................................................ 701/112
   See application file for complete search history.

(56) References Cited

U.S. PATENT DOCUMENTS

| | | | | |
|---|---|---|---|---|
| 9,206,893 B2* | 12/2015 | Lenz | ................. | F16H 59/36 701/112 |
| 2005/0051125 A1* | 3/2005 | Braun | ................. | B60K 6/48 123/179.3 |
| 2006/0116797 A1* | 6/2006 | Moran | ................. | B60K 6/12 701/22 |
| 2008/0053402 A1* | 3/2008 | Hawkins | .............. | F02D 25/04 123/350 |
| 2008/0318731 A1* | 12/2008 | Denis | ................ | B60W 10/06 477/99 |
| 2012/0029796 A1* | 2/2012 | Chen | ............... | B60W 30/18018 701/113 |

(Continued)

FOREIGN PATENT DOCUMENTS

| | | |
|---|---|---|
| DE | 102006042606 A1 | 3/2008 |
| JP | 09144587 A | 6/1997 |

(Continued)

*Primary Examiner* — Hieu T Vo
*Assistant Examiner* — Arnold Castro
(74) *Attorney, Agent, or Firm* — Lorenz & Kopf LLP (57) ABSTRACT

The present disclosure provides a method of controlling an automatic engine stop of an automotive system, during a coasting phase. A dynamic speed threshold is calculated as a minimum value of a plurality of dynamic speed values. Each dynamic speed value is calculated as a function of an automotive system parameter such as a steering wheel angle, a steering wheel angle rate, a wheel speed difference, an antilock braking system status, or an electronic stability control status (p5) and/or a road condition such as road grade. The automatic engine stop is enabled when a vehicle speed is lower than the dynamic speed threshold.

14 Claims, 4 Drawing Sheets

(56) References Cited

U.S. PATENT DOCUMENTS

| | | | | |
|---|---|---|---|---|
| 2012/0179357 A1* | 7/2012 | Phillips | ................. | F02D 17/02 701/112 |
| 2012/0220424 A1* | 8/2012 | Staudinger | ............ | B60W 30/16 477/80 |
| 2012/0270701 A1* | 10/2012 | Christen | ............... | B60W 10/06 477/171 |
| 2013/0131966 A1* | 5/2013 | Hirano | ................... | F02D 17/00 701/112 |
| 2014/0288807 A1* | 9/2014 | Tribulowski | ........ | F02N 11/0818 701/112 |
| 2014/0336908 A1* | 11/2014 | Mori | .................. | F02N 11/0822 701/112 |
| 2015/0006064 A1* | 1/2015 | Dextreit | ............. | F02N 11/0822 701/112 |

FOREIGN PATENT DOCUMENTS

| | | | |
|---|---|---|---|
| JP | 2000161100 A | 6/2000 | |
| JP | 2000356147 A | 12/2000 | |
| JP | 2010216421 A | 9/2010 | |

\* cited by examiner

METHOD OF CONTROLLING AN AUTOMATIC ENGINE STOP DURING COASTING PHASE

CROSS REFERENCE TO RELATED APPLICATION

This application claims priority to British Patent Application No. 1318117.7 filed Oct. 14, 2013, which is incorporated herein by reference in its entirety.

TECHNICAL FIELD

The present disclosure relates to a method of controlling an automatic engine stop during a vehicle coasting phase. The method is particularly suitable for automotive systems provided with a controller configured to automatically stop and start the internal combustion engine, with or without hybrid architecture and without regard to transmissions type (i.e., manual or automatic).

BACKGROUND

It is known that many automotive systems are provided with a controller, normally an electronic control unit (ECU), which is configured to perform, among other functions, a "Stop & Start" (or simply S/S) function. By using this function, the ECU automatically shuts down and restarts the internal combustion engine to reduce the amount of time the engine spends idling, thereby reducing fuel consumption and emissions.

In particular, content of the roadmap of engine manufacturers, aimed to reduce fuel consumption and carbon dioxide ($CO_2$) emissions, is the extension of the "Stop & Start" potential using a "soft electrification" to meet Corporate Average Fuel Economy (CAFE) target, foreseen in 2020. CAFE are regulations in the United States, intended to improve the average fuel economy of cars and light trucks. An extended use of the "Stop & Start" function is realized, by stopping the engine not only if the vehicle speed is zero, but also if the vehicle is slowing down, practically when the vehicle speed is lower than a predetermined threshold. The enhanced S/S during coasting phase is called "Sailing". In other words, there is an ability of the vehicle to shut-off the engine at high vehicle speed, for example at 120 kph or about 75 mph.

In some situation, using the "Sailing" function can decrease drivability and handling of the vehicle. In fact, while during straight driving and flat road condition there is no issue; in real driving conditions the engine shutoff at high vehicle speed may not be desirable. Therefore, a need exists for a new method of controlling an automatic engine stop, which enables the "Sailing" function avoiding the above problems.

SUMMARY

The present disclosure provides a method of controlling an automatic engine stop, which enables the "Sailing" function under certain conditions as a function of one or more driving parameters and road conditions. An embodiment of the disclosure provides a method of controlling an automatic engine stop of an automotive system, during a coasting phase. The automotive system includes an internal combustion engine and a controller for automatically stopping and starting the internal combustion engine. The sailing function is cyclically performed as follows. A dynamic speed threshold is calculated as a minimum value of a plurality of dynamic speeds. Each of the dynamic speeds being calculated as a function of an automotive system parameter. The automatic engine stop is enabled when a vehicle speed is lower than the dynamic speed threshold.

Consequently an apparatus is disclosed controlling an automatic engine stop of an automotive system. The apparatus includes means for calculating a dynamic speed threshold, as a minimum value of a plurality of dynamic speeds, each of them being calculated as a function of an automotive system parameter, and means for enabling the automatic engine stop, if a vehicle speed is lower than the dynamic speed threshold.

An advantage of these embodiments is that the "Sailing" function (i.e. the automatic engine stop at non-zero speed) is enabled by maintaining a dynamic speed threshold as the vehicle speed threshold. Such threshold will normally be lower than a speed threshold, used under straight driving and flat road conditions, because it takes into account the vehicle parameters during real driving and road conditions.

According to another embodiment, a first dynamic speed is a function of a steering wheel angle; a second dynamic speed is a function of a steering wheel angle rate and a third dynamic speed is a function of a wheel speed difference. Consequently, the means for calculating a dynamic speed threshold are operating by accounting that a first dynamic speed is a function of a steering wheel angle; a second dynamic speed is a function of a steering wheel angle rate and a third dynamic speed is a function of a wheel speed difference. An advantage of this embodiment is that the dynamic speed threshold takes into account the conditions when the vehicle is steering.

According to a further embodiment, a fourth dynamic speed is a step function of an antilock braking system status, a fifth dynamic speed is a step function of an electronic stability control status. Consequently, the means for calculating a dynamic speed threshold are operating by accounting that a fourth dynamic speed is a step function of an antilock braking system status, a fifth dynamic speed is a step function of an electronic stability control status. An advantage of this embodiment is that the dynamic speed threshold takes into account the activation of the most important safety devices, which are available in the vehicle.

According to an aspect of this embodiment, a sixth dynamic speed is a function of a road grade. Consequently, the means for calculating a dynamic speed threshold are operating by accounting that a sixth dynamic speed is a function of a road grade. An advantage of this embodiment is that the dynamic speed threshold also takes into account the road conditions, mostly the slope.

According to a further aspect of this embodiment, a static speed threshold corresponds to the maximum value assumed by each of the dynamic speed. Consequently, the means for calculating a dynamic speed threshold are operating by accounting that a static speed threshold corresponds to the maximum value each of the dynamic speed assume. An advantage of this embodiment is to define the maximum value (a so called static speed threshold), which the dynamic speeds can assume, equal to the threshold value which is used under straight and flat conditions.

According to a still further embodiment the dynamic speed threshold is equal to the static speed threshold if each of the root mean square values of the correspondent automotive system parameter is lower than a threshold value of the corresponding automotive system parameter. Consequently, the means for calculating a dynamic speed threshold are operating by accounting that the dynamic speed threshold is equal to the static speed threshold if each of the root mean square values of the correspondent automotive system parameter is lower than a threshold value of the corresponding automotive system parameter. An advantage of this embodiment is that a suitable reset strategy is put in place, restoring a higher speed threshold and not penalizing the use of the "Sailing" function under certain driving conditions.

A still further embodiment discloses an automotive system including an internal combustion engine and a controller for automatically stopping and starting the internal combustion engine, such controller being configured to carry out the method according to any of the previous embodiments. The method according to one of its aspects can be carried out with the help of a computer program including a program-code for carrying out all the steps of the method described above, and in the form of computer program product including the computer program.

The computer program product can be embedded in a control apparatus for an internal combustion engine, including an electronic control unit (ECU), a data carrier associated to the ECU, and the computer program stored in a data carrier, so that the control apparatus defines the embodiments described in the same way as the method. In this case, when the control apparatus executes the computer program all the steps of the method described above are carried out.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
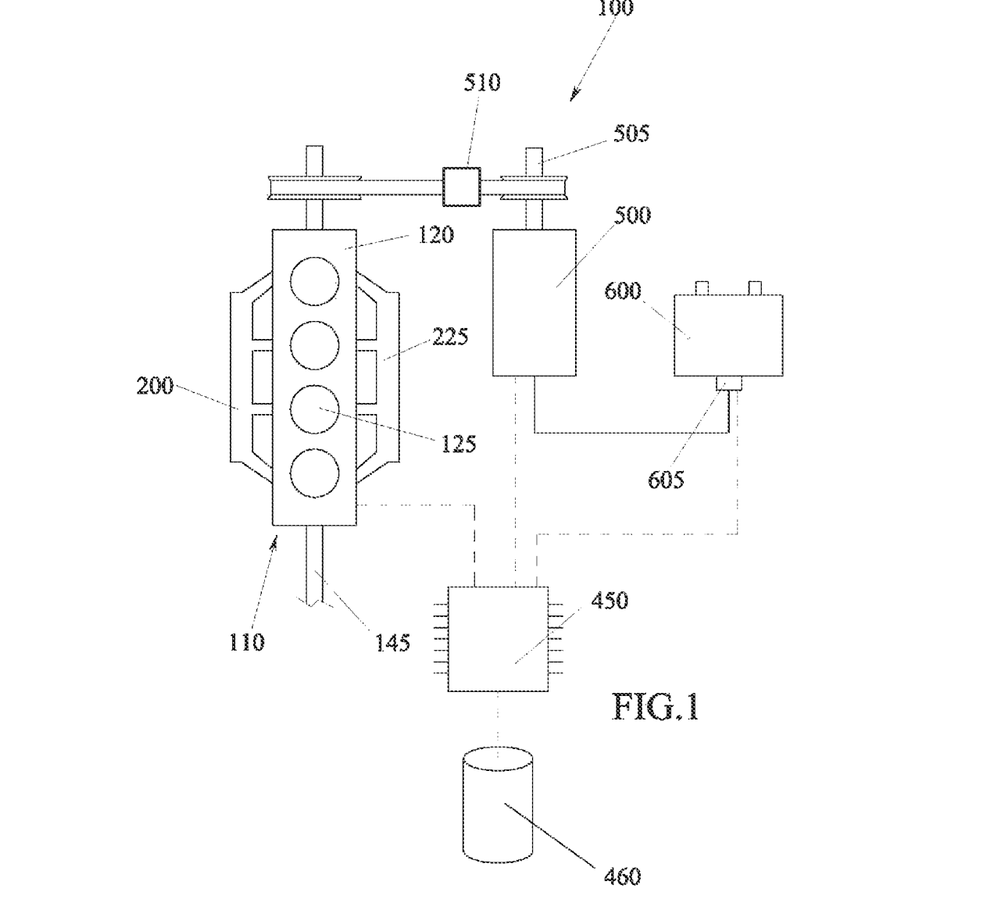
FIG. 1 schematically represents a hybrid powertrain of a motor vehicle.

Some embodiments may include a motor vehicle automotive system 100, as shown in FIG. 1, that includes an internal combustion engine (ICE) 110, in this example a diesel engine, a transmission (a manual transmission 510 in the example of FIG. 1), a motor-generator electric unit (MGU) 500, an electric energy storage device (battery) 600 electrically connected to the MGU 500, and an electronic control unit (ECU) 450. The hybrid powertrain architecture has at least a direct electric drive axle, the rear axle 520 in the example of FIG. 1.

Figure 2:
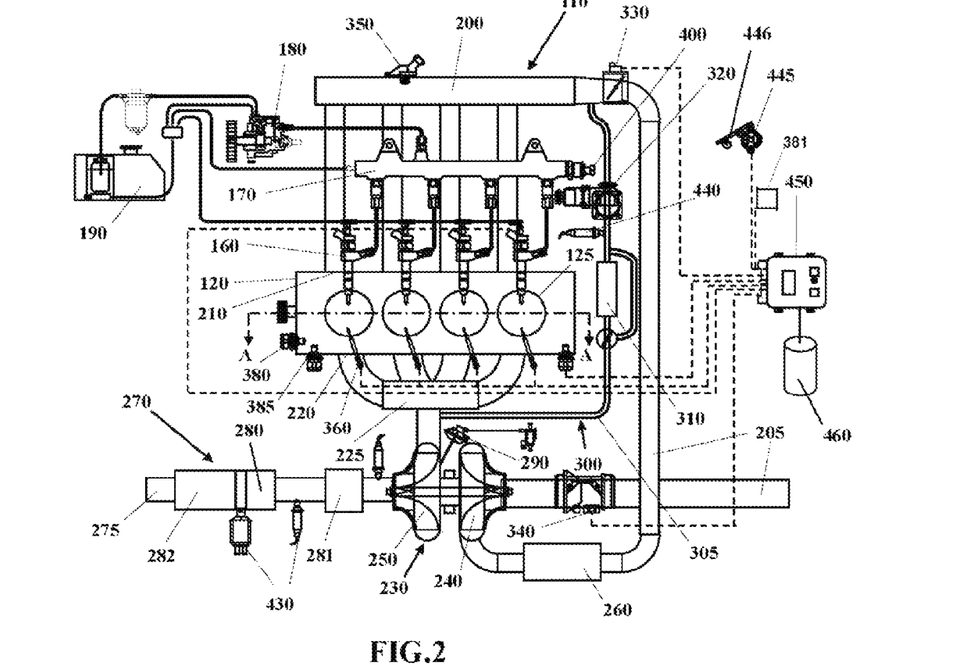
FIG. 2 shows in more details an internal combustion engine belonging to the hybrid powertrain of FIG. 1.
Figure 3:
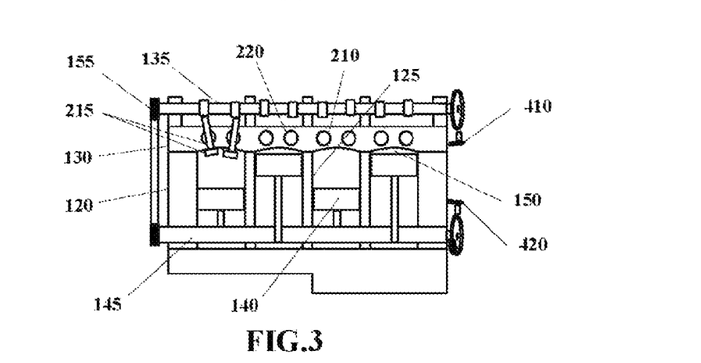
FIG. 3 is a section A-A of the internal combustion engine of FIG. 2.

As shown in FIGS. 2 and 3, the ICE 110 has an engine block 120 defining at least one cylinder 125 having a piston 140 coupled to rotate a crankshaft 145. A cylinder head 130 cooperates with the piston 140 to define a combustion chamber 150.

A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine. In other embodiments the turbocharger 230 may have a fixed geometry and/or include a waste gate actuator 290.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The hybrid powertrain 100 may further include a controller, for example an electronic control unit (ECU) 450, in communication with one or more sensors and/or devices associated with the ICE 110 and equipped with a data carrier 460. The ECU 450 may receive input signals from various sensors configured to generate the signals in proportion to various physical parameters associated with the ICE 110 and the MGU 500.

The MGU 500 is an electric machine, namely an electromechanical energy converter, which is able either to convert electricity supplied by the battery 600 into mechanical power (i.e., to operate as an electric motor) or to convert mechanical power into electricity that charges the battery 600 (i.e., to operate as electric generator). In greater details, the MGU 500 may include a rotor, which is arranged to rotate with respect to a stator, in order to generate or respectively receive the mechanical power. The rotor may include means to generate a magnetic field and the stator may include electric windings connected to the battery 600, or vice versa. If the MGU 500 operates as electric motor, the battery 600 supplies electric currents in the electric windings, which interact with the magnetic field to set the rotor in rotation. Conversely, when the MGU 500 operates as electric generator, the rotation of the rotor causes a relative movement of the electric wiring in the magnetic field, which generates electrical currents in the electric windings. The MGU 500 may be of any known type, for example a permanent magnet machine, a brushed machine or an induction machine. The MGU 500 may also be either an asynchronous machine or a synchronous machine.

The rotor of the MGU 500 may include a coaxial shaft 505, which is mechanically is connected with other components of the hybrid powertrain 100, so as to be able to deliver or receive mechanical power to and from the final drive of the motor vehicle. In this way, operating as an electric motor, the MGU 500 can assist or replace the ICE 110 in propelling the motor vehicle, whereas operating as an electric generator, especially when the motor vehicle is braking, the MGU 500 can charge the battery 600. In the present example, the MGU shaft 505 is connected with the ICE crankshaft 145 through a transmission belt 510, similarly to a conventional alternator starter. In order to switch between the motor operating mode and the generator operating mode, the MGU 500 may be equipped with an appropriate internal control system.

In order to carry out these methods, the ECU 450 is in communication with one or more sensors and/or devices associated with the ICE 110, the MGU 500 and the battery 600. The ECU 450 may receive input signals from various sensors configured to generate the signals in proportion to various physical parameters associated with the ICE 110, the MGU 500 and the battery 600. The sensors include, but are not limited to, a mass airflow and temperature sensor 340, a manifold pressure and temperature sensor 350, a combustion pressure sensor 360, coolant temperature sensor 380 (which, in case the engine coolant circuit is provided with a switchable water pump 381, can also provide the information of switching off the pump 381, for example, during engine start-up), oil temperature sensor 385, a fuel rail pressure sensor 400, a camshaft position sensor 410, a crankshaft position sensor 420, exhaust pressure and temperature sensors 430, an EGR temperature sensor 440, a sensor 445 of a position of an accelerator pedal 446, and a measuring circuit capable of sensing the state of charge of the battery 600. Furthermore, the ECU 450 may generate output signals to various control devices that are arranged to control the operation of the ICE 110 and the MGU 500, including, but not limited to, the fuel injectors 160, the throttle body 330, the EGR Valve 320, the VGT actuator 290, the cam phaser 155, and the above mentioned internal control system of the MGU 500. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110 and the MGU 500.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

According to an embodiment of the present disclosure, the automotive system 100 (or more in general the motor vehicle) as described above, is provided with a start and stop device which is controlled by the ECU and can automatically stop the engine. The "Stop & Start" function is extensively used, by stopping the engine not only when the vehicle speed is zero, but also when the vehicle is slowing down, practically when the vehicle speed is lower than a predetermined threshold as referred to as an enhanced S/S. Therefore, the ECU can perform the enhanced S/S during a coasting phase (in this case shutting off the engine the vehicle driving is called "Sailing"). The engine can be shut off at high vehicle speed, for example at 120 kph or about 75 mph.

Figure 4:
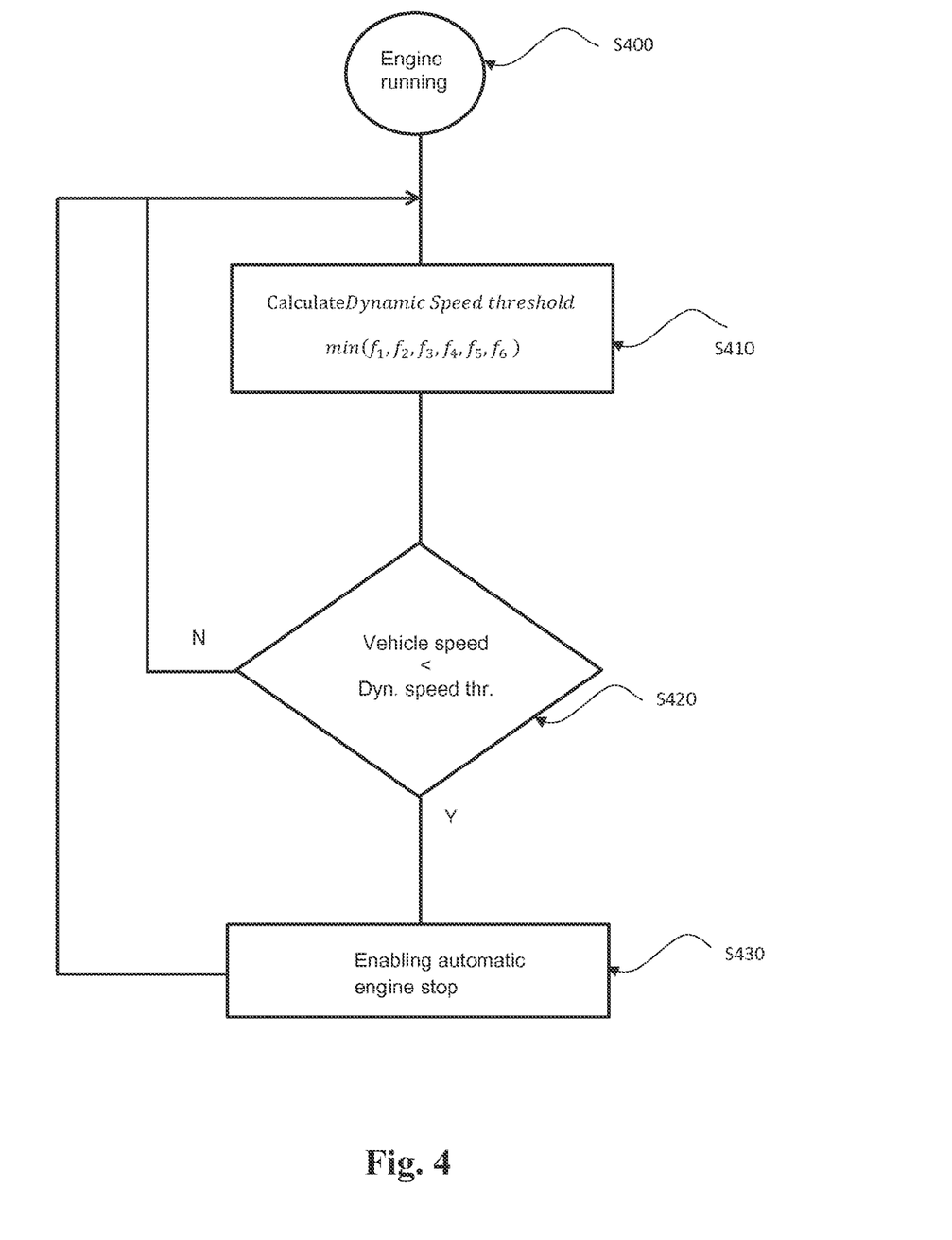
FIG. 4 is a high level flowchart of a method of controlling an automatic engine stop of an automotive system, during a coasting phase, according to an embodiment of the present disclosure.

With reference to FIG. 4, in order to take into account the real driving conditions, different from easy driving conditions (straight driving, flat road), according to a preferred embodiment of the present disclosure, the method cyclically performs the step of calculating S410 a dynamic speed threshold ($V_{dyn\_thr}$). This value is a minimum value of a plurality of dynamic speeds ($V_{dyn1}$, $V_{dyn2}$, $V_{dyn3}$, $V_{dyn4}$, $V_{dyn5}$, $V_{dyn6}$), each of which is calculated as a function of an associated automotive system parameter (p1, p2, p3, p4, p5, p6). The sailing driving condition, which means an automatic shut off of the engine, is enabled S430 if a vehicle speed V is lower than S420 the dynamic speed threshold $V_{dyn\_thr}$.

Preferably, the method identifies six parameters to calculate the maximum vehicle speed to allow the "Sailing" function, namely a steering wheel angle (p1), a steering wheel angle rate (p2), a wheel speed difference (p3), an antilock braking system (ABS) status (p4), an electronic stability control (ESC) status (p5) and a road grade (p6). For each parameter an associated function is defined to calculate the maximum allowed speed. Therefore, a first dynamic speed ($V_{dyn1}$) is a function of the steering wheel angle (p1), a second dynamic speed ($V_{dyn2}$) is a function of the steering wheel angle rate (p2) and a third dynamic speed ($V_{dyn3}$) is a function of the wheel speed difference (p3). In this way the conditions when the vehicle is steering under a curved trajectory can be taken into account.

Moreover, a fourth dynamic speed ($V_{dyn4}$) is a step function of the antilock braking system status (p4), a fifth dynamic speed ($V_{dyn5}$) is a step function of the electronic stability control status (p5). In this way, the method incorporates vehicle control systems, which are available in the vehicle. Finally, a sixth dynamic speed ($V_{dyn6}$) is a function of a road grade (p6), to also take into account the road conditions, namely, the slope.

The algorithm takes the minimum value between six dynamic speeds to arrive at the dynamic speed threshold ($V_{dyn\_thr}$). The "Sailing" function is enabled S430 if the vehicle speed is lower than S420 the calculated dynamic speed threshold. The maximum value each of the dynamic speed ($V_{dyn1}$, $V_{dyn2}$, $V_{dyn3}$, $V_{dyn4}$, $V_{dyn5}$, $V_{dyn6}$) can assume corresponds to a so called static speed threshold ($V_{st\_thr}$), which is the speed threshold enabling the sailing function when there are straight and flat driving conditions. For example, the static speed threshold can be fixed at 120 kph or about 70 mph.

The functions related to the steer wheel angle (p1), the steer wheel angle rate (p2), the wheel speed difference (p3) and the road grade (p6) are injective functions. Only as an example, the following table shows the values the dynamic speeds assume vs. the automotive system parameters.

TABLE 1

| Steer wheel angle (p1) (degree) | Dynamic speed ($V_{dyn1}$) (kph) | Steer wheel angle rate (p2) (degree/s) | Dynamic speed ($V_{dyn2}$) (kph) | Wheel speed difference (p3) (rpm) | Dynamic speed ($V_{dyn3}$) (kph) | Road grade (p6) (%) | Dynamic speed ($V_{dyn6}$) (kph) |
|---|---|---|---|---|---|---|---|
| −50 | 0 | −100 | 0 | 0 | 120 | −15 | 0 |
| −20 | 30 | −25 | 30 | 10 | 100 | −10 | 50 |
| −10 | 70 | −5 | 70 | 25 | 70 | −5 | 120 |
| 0 | 120 | 0 | 120 | 50 | 30 | 0 | 120 |
| 10 | 70 | 5 | 70 | 100 | 0 | 5 | 120 |
| 20 | 30 | 25 | 30 | | | 10 | 15 |
| 50 | 0 | 100 | 0 | | | 15 | 0 |

In the above table, odd columns show the values of the automotive system parameters, while even columns show the corresponding values of the dynamic speeds. The dynamic speed threshold will be the minimum value of the six dynamic speed values. For example, if the vehicle is in the situation as in the bolded line (second line of the numbers) the dynamic speed threshold would be 30 kph.

The functions related to the antilock braking system (ABS) status (p4) and the electronic stability control (ESC) status (p5) are step functions. In other words, if the status is not active, the output is the highest allowed "Sailing" speed threshold (i.e. the static speed threshold), while if the status is active, the output is a lower allowed "Sailing" speed threshold, which can be fixed, for example, at 20 kph or about 12 mph.

Figure 5:
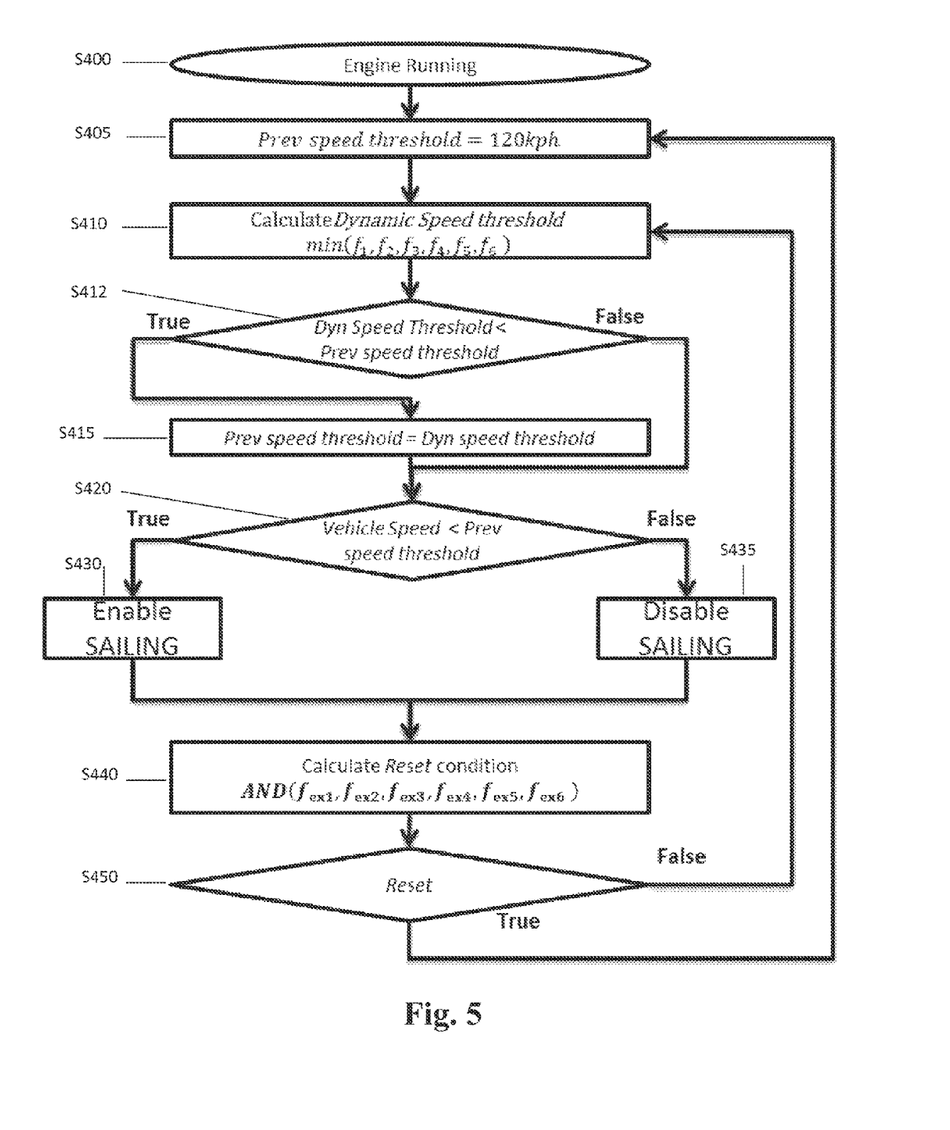
FIG. 5 is a more detailed flowchart of the previous method, according to another embodiment of the present disclosure.

According to another embodiment of the present disclosure and with reference to FIG. 5, after the engine is running S400, the static speed threshold ($V_{st\_thr}$) is taken as default S405. For example, this value can be equal to 120 kph or about 75 mph. Then, the dynamic speed threshold ($V_{dyn\_thr}$) is calculated S410, according to the previous embodiment, already described. This value is compared S412 with the previous speed threshold (whatever static or dynamic speed threshold). If the dynamic speed threshold is lower than the previous one, it becomes S415 the new speed limit to enable the sailing function.

The sailing driving condition is enabled S430 if the vehicle speed V is lower than S420 the dynamic speed threshold ($V_{dyn\_thr}$) or, on the contrary, the sailing function is not enabled or is disabled (if already active) S435.

When some conditions reducing the dynamic speed threshold occur, the speed threshold is kept lower than the maximum allowed one, as we have learnt. This situation could decrease the fuel economy benefit due to a small speed range to enable the "Sailing" function. Therefore, when the driving conditions go back to a safe state for a certain time range (i.e. flat and straight road, good road surface . . . ), the dynamic speed threshold has to return to the maximum allowed value. This condition is called "reset condition" and is calculated S440 on the basis of a root mean square value of each automotive system parameter. Therefore, the dynamic speed threshold ($V_{dyn\_thr}$) is rest and become equal to the static speed threshold ($V_{st\_thr}$) if each of the root mean square value ($p_{ex1}$, $p_{ex2}$, $p_{ex3}$, $p_{ex4}$, $p_{ex5}$, $p_{ex6}$) of the correspondent automotive system parameter (p1, p2, p3, p4, p5, p6) is lower than S450 a threshold value ($p1_{thr}$, $p2_{thr}$, $p3_{thr}$, $p4_{thr}$, $p5_{thr}$, $p6_{thr}$) of the corresponding automotive system parameter. The threshold values can be fixed, as an example, as follows: $p1_{thr}=1°$, $p2_{thr}=5°/s$, $p3_{thr}=5$ rpm, $p4_{thr}=0$ (no active ABS), $p5_{thr}=0$ (no active ESC), $p6_{thr}=1\%$.

Summarizing, the present method allows remarkable benefits in that it allows an extensive use of the automatic engine stop at high speed ("Sailing"), increasing fuel economy of about 4% to 10%. Such fuel economy benefit is guaranteed when driving conditions are good (flat and straight road, good road surface). Moreover, the method takes into account real driving condition by reducing the "Sailing" speed threshold in some critical driving maneuvers and conditions.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A method of controlling an automotive system having an internal combustion engine for automatically stopping and starting the internal combustion engine during a coasting phase comprising:
   calculating a dynamic speed threshold as a minimum value of a plurality of dynamic speeds, and each dynamic speed is calculated as a function of an automotive system parameter; and
   enabling an automatic engine stop when a vehicle speed is lower than the dynamic speed threshold,
   wherein the method is cyclically performed and a static speed threshold corresponds to the maximum value assumed by each of said plurality of dynamic speeds.

2. The method according to claim 1, wherein the dynamic speed threshold is equal to the static speed threshold when each of the root mean square value of a corresponding automotive system parameter is lower than a threshold value of the corresponding automotive system parameter.

3. An automotive system comprising an internal combustion engine and a controller configured to automatically stop and start the internal combustion engine, said controller being operable to carry out the method according to claim 1.

4. A non-transitory computer program comprising a computer-code operable on a controller for performing the method according to claim 1.

5. A computer program product on which the non-transitory computer program according to claim 4 is stored.

6. A control apparatus for an internal combustion engine comprising an electronic control unit, a memory system associated to the electronic control unit and a non-transitory computer program according to claim 5 stored in the memory system.

7. The method according to claim 1, wherein said plurality of dynamic speeds is selected from the group consisting of a first dynamic speed which is a function of a steering wheel angle, a second dynamic speed which is a function of a steering wheel angle rate, a third dynamic speed which is a function of a wheel speed difference, a fourth dynamic speed which is a step function of an antilock braking system status, a fifth dynamic speed is a step function of an electronic stability control status, a sixth dynamic speed which is a function of a road grade and combinations thereof.

8. The method according to claim 1, wherein said plurality of dynamic speeds comprise a first dynamic speed which is a step function of an antilock braking system status, and a second dynamic speed is a step function of an electronic stability control status.

9. The method according to claim 8, wherein a third dynamic speed is a function of a road grade.

10. The method according to claim 1, wherein a first dynamic speed is a function of a road grade.

11. A method of controlling an automotive system having an internal combustion engine and a controller for automatically stopping and starting the internal combustion engine during a coasting phase comprising:
    calculating a dynamic speed threshold in the controller based on a minimum value of a plurality of dynamic speeds, with each dynamic speed calculated as a function of an automotive system parameter and the plurality of dynamic speeds comprise a first dynamic speed that is a step function of an antilock braking system status, and a second dynamic speed that is a step function of an electronic stability control status:
    cyclically re-calculating the dynamic speed threshold when a vehicle speed is higher than the dynamic speed threshold; and
    initiating an automatic engine stop when a vehicle speed is lower than the dynamic speed threshold.

12. A method of controlling an automotive system having an internal combustion engine for automatically stopping and starting the internal combustion engine during a coasting phase comprising:
    calculating a dynamic speed threshold as a minimum value of a plurality of dynamic speeds, and each dynamic speed is calculated as a function of an automotive system parameter; and
    enabling an automatic engine stop when a vehicle speed is lower than the dynamic speed threshold,
    wherein the method is cyclically performed and said plurality of dynamic speeds are selected from the group consisting of a first dynamic speed which is a function of a steering wheel angle, a second dynamic speed which is a function of a steering wheel angle rate and a third dynamic speed which is a function of a wheel speed difference.

13. The method according to claim 12, wherein said plurality of dynamic speeds comprise a fourth dynamic speed which is a step function of an antilock braking system status, and a fifth dynamic speed is a step function of an electronic stability control status.

14. The method according to claim 13, wherein said plurality of dynamic speeds comprise a sixth dynamic speed which is a function of a road grade.

* * * * *